UNITED STATES PATENT OFFICE.

GEORGE HOBART WATERBURY, OF DENVER, COLORADO, ASSIGNOR TO LOS ANGELES METALS EXTRACTION COMPANY, OF LOS ANGELES, CALIFORNIA.

PROCESS FOR THE TREATMENT OF SILICATE OF COPPER.

No. 847,448.     Specification of Letters Patent.     Patented March 19, 1907.

Application filed October 29, 1906. Serial No. 341,140.

*To all whom it may concern:*

Be it known that I, GEORGE HOBART WATERBURY, a citizen of the United States, residing at the city and county of Denver and State of Colorado, have invented a certain new and useful Process for the Treatment of Silicates of Copper; and I do declare the following to be a full, clear, and exact description of the invention, such as will enable others skilled in the art to which it appertains to make and use the same.

My invention relates to a process for the treatment of silicates of copper by leaching, my object being to treat copper ores of this class in a more economical manner than has heretofore been possible by the use of the ordinary methods of leaching.

The process consists of taking all forms of silicates of copper, which formation is vitreous and anhydrous, and subjecting them to a light or red roast, by means of which the formation is quickly changed to a black oxid, or the metal is oxidized, and the vitreous form of the silica is disintegrated, by means of which the ore becomes amenable to the ordinary leaching process. Without this preparatory treatment it is impossible to make a complete extraction of the copper with the ordinary leaching methods.

Heretofore carbonates of copper, in which often occur a large per cent. of silicates, could not be completely leached, if at all, except by the use of acids more powerful than sulfuric. However, as above stated, I have discovered that by giving this class of ores a slight red roast or simply heating them before leaching the formation is quickly changed and the vitreous or glassy form is disintegrated, so that the same ore can be quickly dissolved with a dilute solution of ordinary sulfuric acid.

In the treatment of the ore, both during the roasting operation as well as during the leaching step, no special form of mechanical apparatus is necessary.

In the treatment of the ore containing silicates of copper it is first pulverized to the desired mesh, after which it is subjected to the necessary heat to produce what I term a "light roast," after which it is subjected to the leaching step by the use of a dilute solution of ordinary sulfuric acid.

Having thus described my invention, what I claim is—

1. The herein-described process for the treatment of ores containing silicates of copper, consisting in first subjecting the ore to a light roast and subsequently leaching by any of the ordinary methods.

2. The herein-described process for the treatment of ores containing silicates of copper, consisting in first roasting the ore and subsequently leaching the same by the use of sulfuric acid.

3. The herein-described process for the treatment of ore containing silicates of copper, consisting in first roasting the ore and finally leaching the same by the use of a dilute solution of sulfuric acid.

In testimony whereof I affix my signature in presence of two witnesses.

GEORGE HOBART WATERBURY.

Witnesses:
ANNA W. KLUSMANN,
W. E. BURK.